Figure 1:
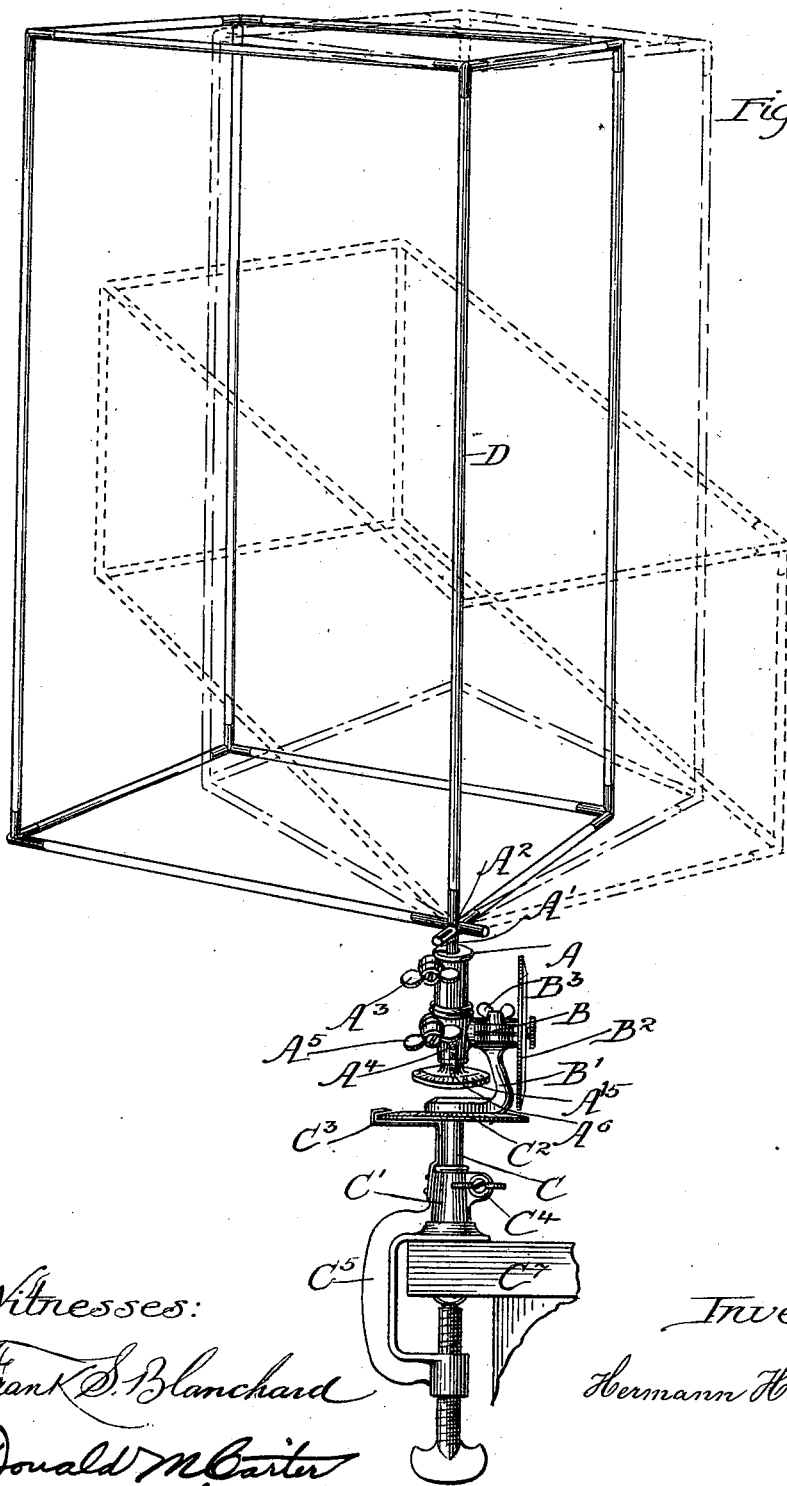

No. 672,062. Patented Apr. 16, 1901.
H. HANSTEIN.
EDUCATIONAL APPLIANCE.
(Application filed Mar. 2, 1898.)
(No Model.) 2 Sheets—Sheet 1.

Witnesses:
Frank S. Blanchard
Donald M. Carter

Inventor:
Hermann Hanstein

No. 672,062. Patented Apr. 16, 1901.
H. HANSTEIN.
EDUCATIONAL APPLIANCE.
(Application filed Mar. 2, 1898.)
(No Model.) 2 Sheets—Sheet 2.
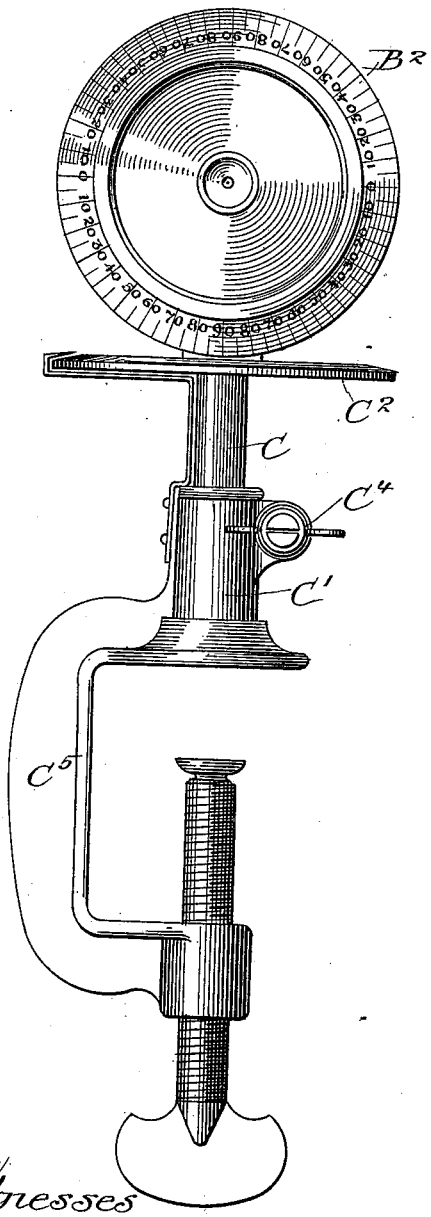
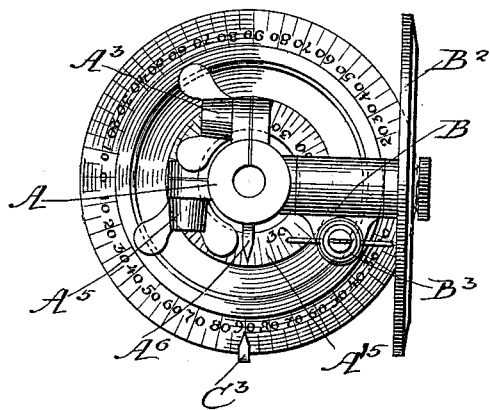
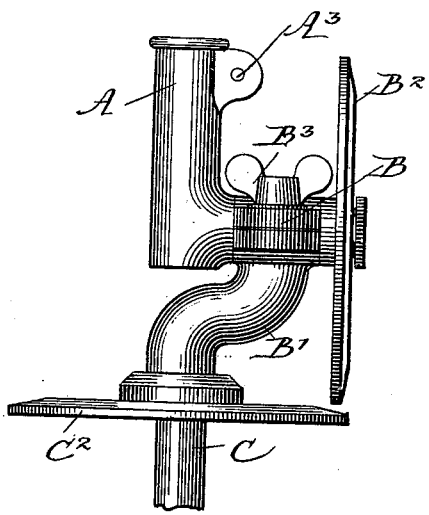
Witnesses
Frank S. Blanchard
Donald M. Carter
Inventor:
Hermann Hanstein.

UNITED STATES PATENT OFFICE.

HERMANN HANSTEIN, OF CHICAGO, ILLINOIS.

EDUCATIONAL APPLIANCE.

SPECIFICATION forming part of Letters Patent No. 672,062, dated April 16, 1901.

Application filed March 2, 1898. Serial No. 672,264. (No model.)

*To all whom it may concern:*

Be it known that I, HERMANN HANSTEIN, a citizen of the United States, residing at Chicago, in the county of Cook and State of Illinois, have invented a certain new and useful Improvement in Educational Appliances, of which the following is a specification.

My invention relates to educational appliances, and has for its object to provide a new and useful appliance for this purpose.

My invention is illustrated in the accompanying drawings, wherein—

Figure 1 is a view of one form of the device or appliance embodying my invention. Fig. 2 is an enlarged view of the device shown in Fig. 1 with the object omitted. Fig. 3 is a plan view of Fig. 2. Fig. 4 is a view showing modified construction.

Like letters refer to like parts throughout the several figures.

In teaching drawing, for example, relating to bodies having three dimensions or in the study of solid geometry, projections, or other like studies dealing with figures having three dimensions it is very difficult, indeed, to give a correct idea to the pupil of the various bodies and figures under discussion by representing them upon a plane surface.

The object of my invention is to provide the instructor with means of representing such bodies accurately to the students, so that they may be provided with an accurate visual representation of the thing under discussion, thus enabling them afterward to properly reproduce it by the aid of their imagination.

In carrying out my invention I provide a device to which the object under contemplation may be attached. The device is so constructed as to allow the position of the object to be varied in order that it may be presented to the sight in any desired position and be held in any of its various positions when desired, so as to be continuously under inspection while in this position. Referring now to the drawings, wherein I have shown a device for this purpose, I provide an engaging or holding device A of any suitable description and adapted to engage the object to be presented. As herein illustrated, I have shown the engaging device as adapted to be used in connection with skeleton models or figures, such engaging device consisting of the part A, provided with an opening in which is inserted the arm or projection A' on the corner-piece $A^2$ of the skeleton model. The part A is provided with the thumb-screw $A^3$, by means of which the projection A' may be tightly gripped. This holding or engaging part A is rotatably mounted in a suitable bearing $A^4$, the bearing being provided with the tightening device or thumb-screw $A^5$, by which the part A may be tightly gripped, so as to be held in a given position. Connected with the holding part A is a graduated arc or disk $A^{15}$, the fixed pointer $A^6$ being associated therewith, so that the holding device may be rotated about its axis and fixed in any given position by setting the pointer opposite some particular graduation on the scale. The bearing $A^4$, in which the holding part A is mounted, is itself provided with a projecting part mounted in a bearing B at the upper end of the arm B'. Attached to this projecting part, and hence to the bearing $A^4$, is a graduated circle or disk $B^2$, the part so arranged that the axis of the holding device A may be moved to any given position in the plane in which it is located. The bearing B is provided with means for gripping the projecting part of bearing $A^4$, so that the holding device may be held in any of its various positions. I have shown this bearing as being split, the parts provided with a thumb-screw $B^3$, so that they may be moved with relation to each other, thus gripping or releasing the parts mounted therein. The arm B' is connected with a shaft C, mounted in a bearing C', said shaft being provided with a graduated disk $C^2$, said disk being provided with the stationary pointer $C^3$, past which the graduations move. A suitable pointer may be provided for the graduated disk $B^2$, or I may use one of the graduations on disk $C^2$ as the indicating device by means of which the graduations are read. The bearing C' is also provided with means for clamping and releasing shaft C—as, for example, the thumb-screw $C^4$. Said bearing is also provided with suitable means of attaching it to a fixed support. Any suitable means may be used for this purpose, and I have shown in the drawings the simple clamp $C^5$, by means of which the device may be clamped to the edge $C^7$ of a table or the like.

I have described in detail a particular construction embodying my invention; but it is of course evident that the various parts may be changed in form of construction and arrangement, if desired, without in any manner departing from the spirit of my invention. It is also evident that some of the parts may be omitted and others used with parts not herein shown, if desired. For example, I have shown in Fig. 4 a construction in which the holding part A is not rotatable; but it is rigidly fastened to the shaft or part carrying the graduated disk $B^2$. This construction does not allow as many positions of the object presented as may be obtained by means of the device shown in Figs. 1 and 2.

Referring now to Fig. 1, I have shown a skeleton model D, provided with removable corner-pieces, the corner-piece $A^2$ being provided with suitable projections A', which are not used in making up the model, but which project beyond the figure and which can be attached in various positions to the holding part A. When it is desired to present the figure in various positions to the students, one of the projecting parts A' is inserted in the opening in the engaging part A and the thumb-screw $A^3$ tightened. Said engaging part A may then be rotated about its axis, thus allowing the figure to be completely rotated. By loosening the thumb-screw $B^3$ the axis of the engaging part A may be shifted to any position desired, the figure being held in this position when the thumb-screw is tightened. When the figure is in an inclined position, as shown, for example, in the dotted lines in Fig. 1, due to the movement of the holding device A to an inclined position, said figure may then be rotated about the axis of the engaging device, as heretofore described. A further movement of the object may be obtained by unclamping the thumb-screw $C^4$ and rotating shaft C. It will thus be seen that I have here three axes of rotation which are independent of each other, thus allowing the object presented to be moved to any desired position in space, the graduated disks or arcs associated with these three axes indicating the exact position in space occupied by the object and allowing it to be moved to any predetermined position and held in such position while under consideration. It will therefore be seen that by means of this device I am enabled to present continuously to the view of the student any desired object in any desired position in space and at the same time, if desired, make known to them the exact position occupied by such object.

I have not endeavored to set forth the various uses of my invention; but it will be readily seen that it may be used in considering for any purpose surfaces and solids, thus allowing the students to obtain a correct representation of such surface or solid in any position in space.

It will be found that this device is exceedingly useful in the study of drawing, solid geometry, projection, descriptive geometry, stereotomy, crystallography, and the like.

I claim—

1. An educational appliance for displaying figures and objects to students, comprising a clamp adapted to be clamped to a fixed support, a first support rotatably mounted on the clamp and carrying a bearing and a circular scale, a second support rotatably mounted on the first support and having a bearing and a circular scale at right angles to the first scale, and an object-holder rotatably mounted in the bearing of the second support.

2. An educational appliance for displaying figures and objects to students, comprising a clamp adapted to be clamped to a fixed support and provided with a bearing, a rotatable part mounted in said bearing and having its upper end bent out of alinement with said bearing, a holding device for engaging the article to be displayed, said holding device substantially in the plane of the axis of the clamp-bearing and provided with an angular piece rotatably mounted on the upper end of the part connected with the clamp, said holding device rotatably mounted upon said angular part.

3. An educational appliance for displaying figures and objects to students, comprising a clamp adapted to be clamped to a fixed support and provided with a bearing, a rotatable part mounted in said bearing and having its upper end bent out of alinement with said bearing, a detachable holding device for engaging the article to be displayed, said holding device substantially in the plane of the axis of the clamp-bearing and provided with an angular piece rotatably mounted on the upper end of the part connected with the clamp, and scales connected with said angular part and the rotatable part on the clamp, said scales graduated so as to indicate the various positions of said parts.

4. An educational appliance for displaying figures and objects to students, comprising a clamp adapted to be clamped to a fixed support, a first support rotatably mounted on the clamp and carrying a bearing, a second support rotatably mounted on the first support and having a bearing, an object-holder rotatably mounted in the bearing of the second support, and a circular or disk scale associated with each rotatable part and at right angles one to another.

5. An educational appliance for displaying objects to students, comprising a rotatable part mounted upon a suitable support, a holding device adapted to be connected with the object to be displayed, and rotatably mounted upon said rotatable part, so as to be rotated about an axis at an angle to the axis of rotation of the rotatable part, said holding device substantially in alinement with the axis of said rotatable part.

HERMANN HANSTEIN.

Witnesses:
DONALD M. CARTER,
HOMER L. KRAFT.